UNITED STATES PATENT OFFICE.

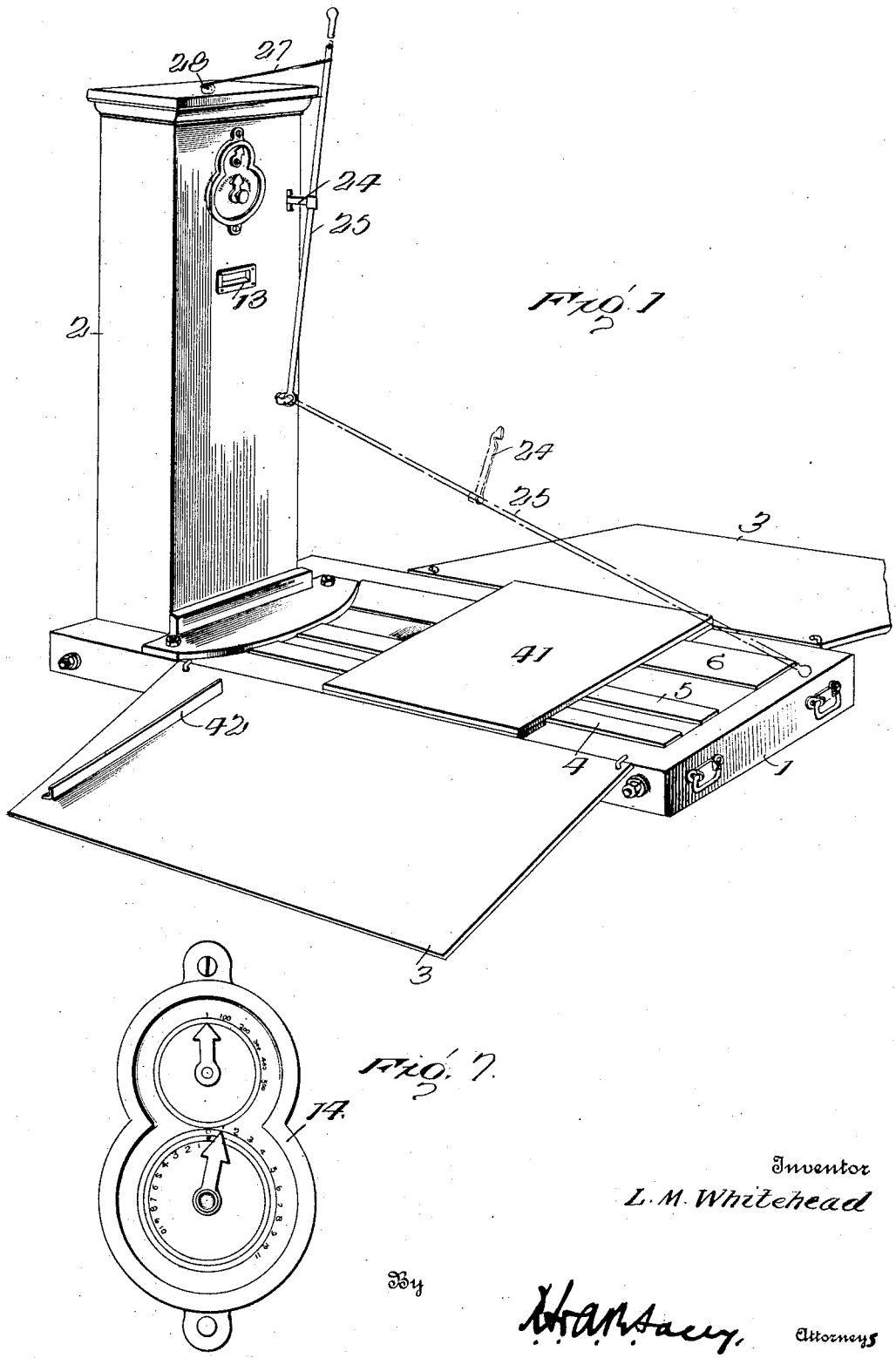

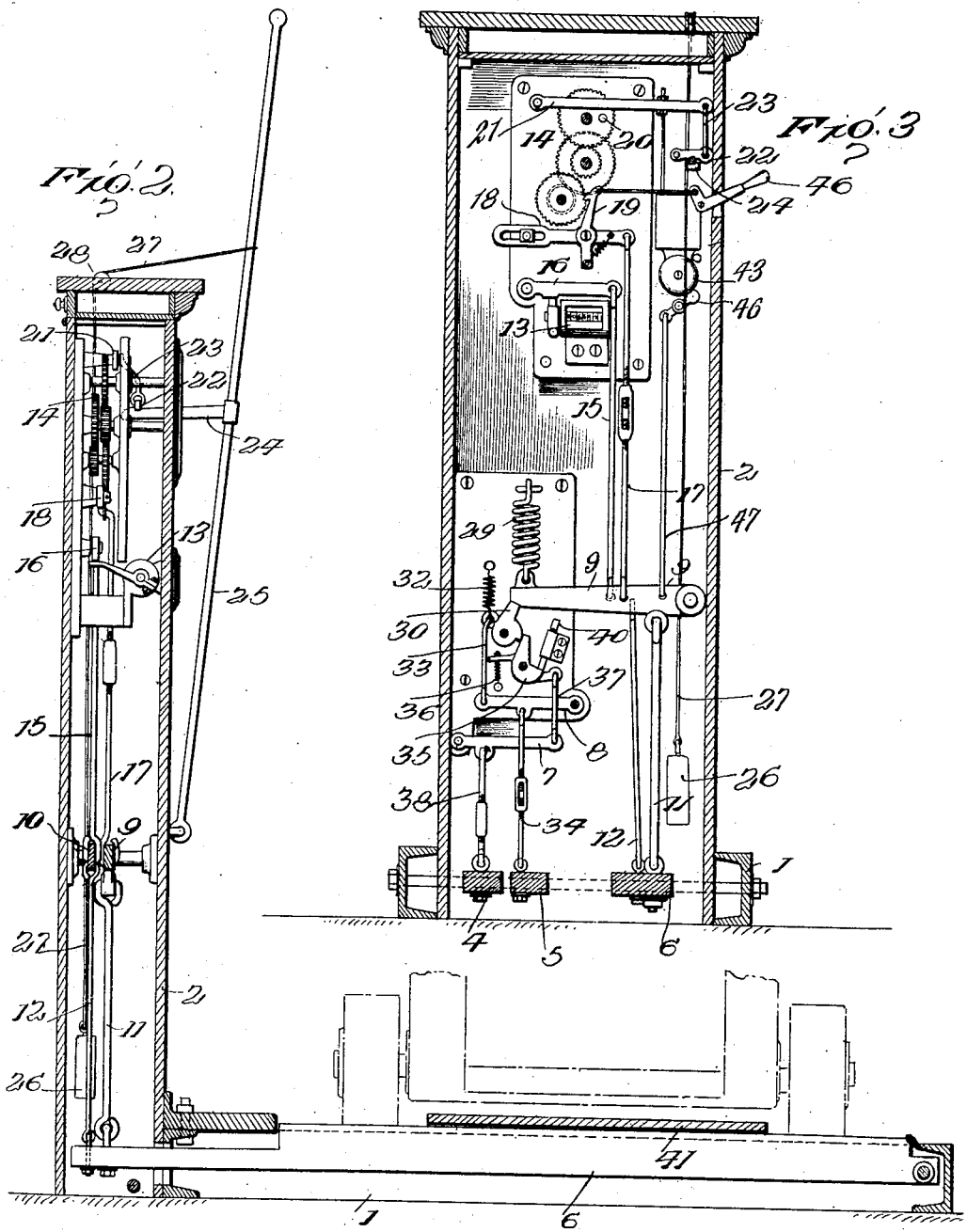

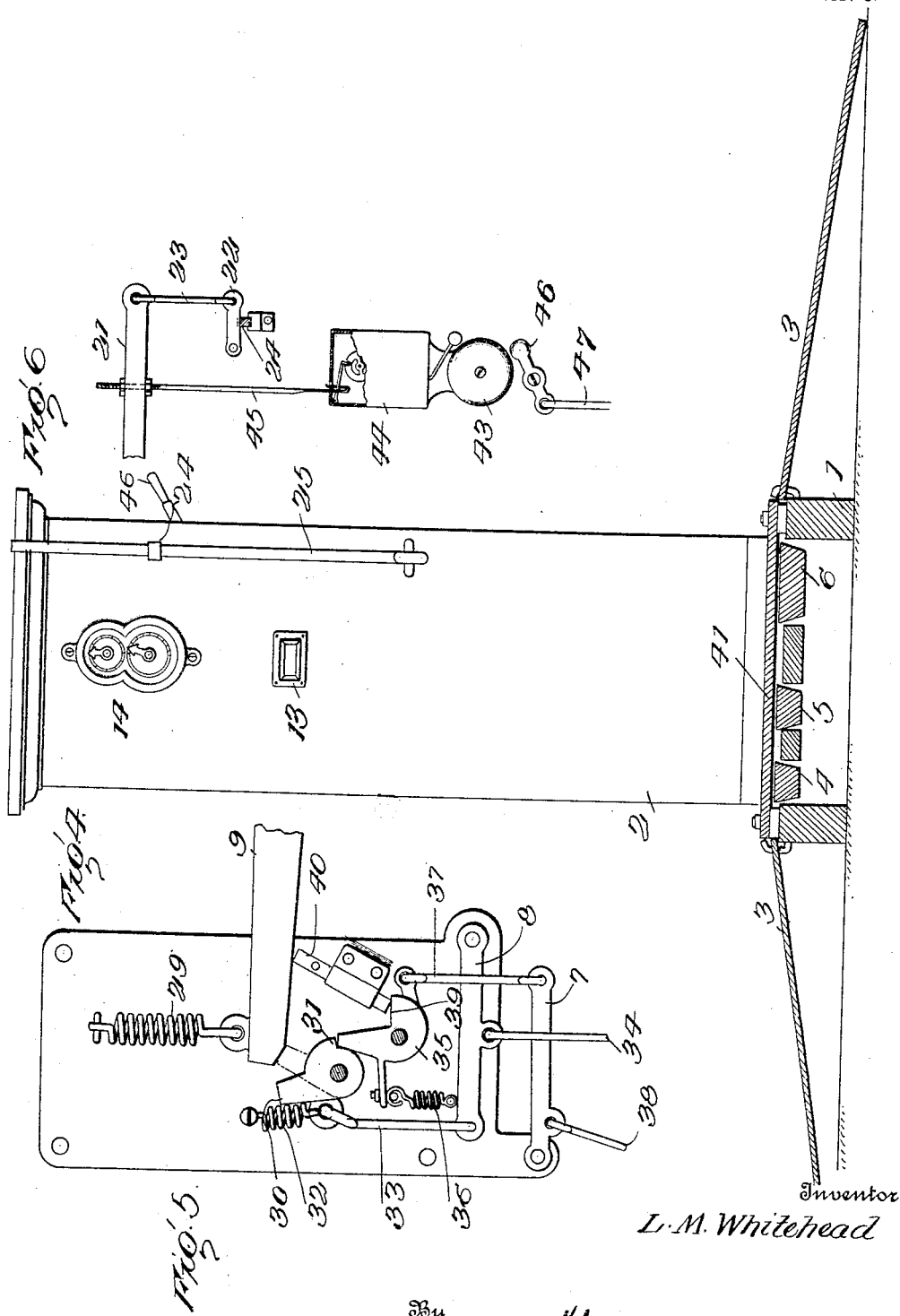

LINWOOD M. WHITEHEAD, OF NORFOLK, VIRGINIA.

FREIGHT-TALLY.

1,234,242.  Specification of Letters Patent.  Patented July 24, 1917.

Application filed June 19, 1915. Serial No. 35,056.

*To all whom it may concern:*

Be it known that I, LINWOOD M. WHITEHEAD, a citizen of the United States, residing at Norfolk, in the county of Norfolk and State of Virginia, have invented certain new and useful Improvements in Freight-Tallies, of which the following is a specification.

In the handling of freight and the shipping and transporting of goods, great difficulty has been experienced in obtaining an accurate record of the number of packages loaded or unloaded and as a result frequent controversies arise as to the quantity shipped and received.

This invention provides a registering machine for keeping tally upon the trucks or like devices utilized for transporting the goods from the warehouse or other storage to the carrier or from the carrier to the place of discharge as when unloading.

The invention provides a registering machine which is automatic in operation and which is actuated by the truck when passing thereover in one direction only, said machine being portable so as to be moved from one place to another to accommodate the position of the carrier which does not always land at a given point.

A further purpose of the invention is the provision of a registering machine which is adapted to be actuated once only during the passage thereover of the truck, the registering mechanism being instantly locked after being actuated, thereby preventing operation from a rebound or temporary halt in the movement of the truck when passing over the machine.

The invention also has for its object the provision of a tallying machine which gives warning at each operation so that it may be known whether each truck or load is recorded as the same passes over the machine without requiring the person in charge to be near the machine and as a result failure of the machine to operate is instantly made known and detection of any attempt to pass by the machine with goods without a record being made instantly ascertained.

The invention, furthermore, provides a registering machine which may be set to give warning when the required load is nearly placed aboard the carrier, thereby saving the expense and trouble incident to the loading of trucks in excess of that required to handle the exact number of packages to be loaded.

With these and other objects in view, which will readily appear as the nature of the invention is better understood, the same consists in the improved construction and novel arrangement and combination of parts which will be hereinafter fully described and particularly claimed.

In the accompanying drawings has been illustrated a simple and preferred form of the invention, it being, however, understood that no limitation is necessarily made to the precise structural details therein exhibited, but that changes, alterations and modifications within the scope of the invention as claimed may be resorted to when desired.

Referring to the drawings,—

Figure 1 is a perspective view of a registering machine embodying the invention;

Fig. 2 is a vertical central longitudinal section thereof;

Fig. 3 is a detail view of the operating mechanism, the inclosing casing and actuating levers being in section;

Fig. 4 is a sectional view of the base and oppositely inclined run ways;

Fig. 5 is an enlarged detail view of the locking means and parts associated therewith for preventing operation of the registering means except at the proper time;

Fig. 6 is a detail view of the signaling means and the release for the guard which obstructs passage over the machine after the predetermined load has been placed aboard the carrier;

Fig. 7 is a detail view of the registering mechanism.

Corresponding and like parts are referred to in the following description and indicated in all the views of the drawings by the same reference characters.

The machine is portable and this is essential to admit of the device being readily moved upon a wharf, quay or like place where goods and products are handled for transportation. The machine is moved so as to occupy a position in the direct line of travel to and from the ship or other carrier. When loading or unloading a vessel the machine is moved upon the wharf to a position at the end of the gang-way resting upon the wharf so that it is necessary to pass over the machine both when entering or leaving the vessel. It is to be understood that the machine is so placed as to operate by movement of the trucks thereover in one direction only. As shown the machine embodies a base 1 and an upright 2, the latter being disposed at one end of the base. These parts are connected in any substantial way and preferably made hollow so as to receive the respective working parts. To facilitate the passage of the trucks over the base 1 when entering and leaving the same run-ways 3 are provided, the same consisting of platforms which rest at their outer edges upon the wharf or other supporting surface receiving the machine and which have their inner edges connected to the base 1 about in the plane of the top thereof. The base 1 receives a plurality of levers, designated respectively, by the numerals 4, 5 and 6, which are pivotally connected at one of their ends to the base and which are operatively connected at their opposite ends to the parts to be actuated thereby as will appear more fully hereinafter. Within the upright portion 2 of the machine are disposed a plurality of levers 7, 8, 9 and 10. The levers 9 and 10 are preferably disposed one beside the other in the same plane, each being connected to the lever 6 by means of rods 11 and 12. These levers 9 and 10 operate in unison as one part by reason of their similarity of construction and connection with the lever 6.

Two registering mechanisms 13 and 14 are provided and located within the upper portion of the part 2 of the framework. A rod 15 forms part of the connecting means whereby movement is transmitted to the registering mechanism 13. The rod 15 is connected at its lower end to the lever 10 and is attached at its upper end to a lever 16 which is arranged to operate the registering mechanism 13. A rod 17 constitutes part of the means for transmitting movement to the registering mechanism 14. The lower end of the rod 17 is attached to the lever 9. The upper end of the rod 17 is connected to a lever 18 which is conveniently disposed for operating the primary element of the registering mechanism 14. A pawl 19 is pivotally mounted upon the lever 18 and is arranged to move the primary element of the registering mechanism at each depression of the movable end of the lever 9. The registering mechanism 13 may be of any make or type designed to be operated at each depression of the lever 10. The registering mechanism 14 may likewise be of any design and comprises a train of gearing and dials or indicating wheels. One of the indicating wheels, preferably that bearing the highest denominate numerals, is provided with a trip 20 which effects release of a barrier and also actuates a signal to give ample warning when the loading of any number of packages or articles is nearing completion so as to avoid the necessity for unloading trucks which have been supplied with packages or articles to be transported to the vessel or carrier. The units wheel of the registering mechanism 14 is actuated at each operation of the lever 18 so as to bring the next numeral in order in position for observation. At each complete revolution of the units wheel the tens wheel is advanced a distance to bring the next higher numeral in position. The construction and operation of the registering mechanism 14 is similar to like tally mechanisms, hence a detailed description is not deemed necessary.

A lever 21 is disposed in such position as to be engaged by the trip 20 to be operated thereby. A catch 22 is connected by means of a link 23 with the free end of the lever 21. An arm 24 projecting from a barrier 25 is adapted to be engaged by the catch 22, thereby holding the barrier 25 elevated, as indicated in Figs. 2 and 4. When the lever 21 is tripped and actuates the catch 22 so as to release the arm 24 and barrier 25, the latter falls across the base 1 of the machine, as indicated by the dotted lines in Fig. 1, thereby obstructing the passage of trucks thereover. The barrier 25 is illustrated as consisting of a rod, or bar, pivoted at one end to the upright portion 2 of the framework. When the barrier is turned into upright position so as to be out of the way and not obstruct traffic over the base of the machine it occupies an inclination to the vertical so that when released it will drop and occupy a position across the base, as indicated by the dotted lines in Fig. 1. To prevent the rapid descent of the free end of the barrier 25 a weight 26 is provided and attached to the lower end of a cord 27, such cord passing over a guide pulley 28 at the top of the upright 2 and such cord having its upper end attached to the barrier 25. When the free end of the barrier descends the weight 26 is drawn upward, thereby modifying the movement of the barrier and preventing its too rapid movement.

A spring 29 is attached at one end to the lever 9 and is connected at its opposite end with the framework in a manner to normally hold the free end of the lever 9 in a given position. The lever 9 is operated by a downward movement when pressure is exerted upon the lever 6 and when the lever 6 is relieved of the operating pressure the lever 9 is returned to normal position by means of the spring 29. In order that the lever 9 may be secured against abnormal movement which would tend to operate the registering mechanisms at such times when no load is to be registered, a lock is provided. This lock device is indicated at 30 and consists of a pivoted dog having a shoulder 31. When the lever 9 is locked the end of the dog 30 engages the terminal portion of the lever 9, as indicated in Figs. 3 and 5. When the dog 30 is moved clear of the lever 9, as indicated by the full lines in Fig. 5, the lever 9 may be actuated to operate the registering mechanism. A spring 32 is disposed so as to normally exert a force to throw the end of the dog 30 into the path of the lever 9 to prevent movement of the latter. The lock, or dog, 30 is connected by means of a link 33 with the lever 8 and the latter is connected by means of a rod 34 with the lever 5. When the lever 5 is depressed the dog 30 is moved out of the path of the lever 9, thereby admitting of the registering mechanisms operating upon depression of the lever 6.

A pivoted detent 35 is arranged to engage with the lock, or dog, 30 and hold the same clear of the lever 9, as indicated by the full lines in Fig. 5. A spring 36 normally exerts a force tending to hold the detent in engagement with the dog 30. When the dog 30 is moved so as to clear the lever 9 the stop shoulder 31 clears the detent 35 and the latter is thrown under such stop shoulder by the action of the spring 36, thereby holding the dog 30 out of the path of the lever 9 whereby the latter may be actuated when the lever 6 is depressed. A link 37 connects the detent 35 with the lever 7 and the latter is coupled to the lever 4 by means of a rod or other suitable connection 38. When the lever 4 is depressed the detent 35 is moved so as to withdraw its end from engagement with the stop shoulder 31, thereby permitting the dog 30 to move under the action of the spring 32 into the path of the lever 9 and thereby prevent improper operation of the registering mechanism. The detent 35 is formed with a shoulder 39 which is adapted to be engaged by the lower end of a push pin 40, the latter being disposed to be engaged by the lever 9 when the latter is depressed with the result that when the registering mechanism is operated it immediately is locked against further movement until released when the dog 30 is moved from out of the path thereof.

The provision of the two registering mechanisms 13 and 14 adds to the reliability of the machine in keeping tally because should one of the registering mechanisms fail to operate from any cause the other will continue to act during the interval that may be required to place the disabled registering mechanism in position for effective service, thereby avoiding the necessity for throwing the mechanism as a whole out of commission. The lock device 30 will be arranged to engage both of the levers 9 and 10, hence but one lock device and adjunctive parts is necessary for both levers 9 and 10. In placing the machine, the same is located in the path of traffic so that the trucks bearing the load are compelled to pass over the base 1 and the series of levers 4, 5 and 6. The machine is so placed that the loaded trucks pass over the levers 4, 5 and 6 in the order mentioned. The empty trucks on the return trip pass over the levers 6, 5 and 4 in the order mentioned. In the normal position of the parts the levers 9 and 10 are locked by means of the dog 30 which occupies the position indicated by full lines in Fig. 3. A loaded truck passing over the lever 4 actuates the same and the detent 35 but produces no result. The truck next passes over the lever 5 which is depressed, thereby releasing the dog 30 from engagement with the lever 9, said dog being moved to the position indicated by full lines in Fig. 5 when it is engaged by the detent 35 and held in such position thereby against the tension of the spring 32. The loaded truck continuing its forward movement passes over the lever 6 and depresses the same, thereby operating both registering mechanisms and at the same time bringing the lever 9 in contact with the push pin 40 which is depressed and moves the detent 35 out of engagement with the stop shoulder 31 of the dog 30 which latter is thrown into locking engagement with the lever 9 by the action of the spring 32, thereby preventing operation of the registering mechanisms on the return of the truck which passes over the levers 6, 5 and 4 in the order stated. On the return of the empty truck it passes over the lever 6 but the registering mechanisms are locked against operation in the manner stated. The truck continuing its return passes over the lever 5 which moves the lock so as to release the lever 9, said lock being held clear of the lever 9 by the action of the detent 35 in the manner stated. The truck continuing on its return movement passes over the lever 4, which is depressed and by reason of the intermediate connections moves the detent 35 out of engagement with the stop shoulder 31 of the lock which latter is thrown into engagement with the lever 9 by means of the spring 32. It will thus be understood that no registering is effected on the return movement of the trucks. A foot board 41 is placed over the middle portion of the base 1 so as to prevent the truck handlers from treading upon the levers and afford a measure of safety in passing over the base. The width of the foot board 41 is such as to provide ample clearance for the wheels of the truck as indicated by dotted lines in Fig. 2. A guard rail 42 is located near the inner end of the forward run-way to prevent the trucks being run too close to the upright portion 2. This guard rail also serves as a guide in directing the movement of the trucks over the machine.

The barrier 25 is utilized as means to prevent passage of the trucks over the machine after a given number of packages, or articles, have been placed aboard the vessel, or carrier. The registering mechanism 14 may be set so as to trip the barrier 25 after a predetermined number of loaded trucks have passed over the base 1 of the machine. This is accomplished by setting a registering mechanism so that when the last of the predetermined number of loaded trucks passes over the machine the trip 20 is brought into engagement with the lever 21 and actuates the same to move the catch 22 out of engagement with the arm 24, thereby releasing the barrier which drops into the position indicated by the dotted lines in Fig. 1 so as to obstruct further traffic over the machine.

It has also been found advisable to give ample warning when the predetermined number of packages, or articles, to be placed aboard the vessel, or carrier, has been nearly reached, thereby preventing the loss of time and labor incident to loading trucks in excess of that required for completing the number to be loaded on board the vessel, or carrier. This is accomplished by means of a signal which, as shown, consists of a gong 43 and a movement 44, the latter being tripped by means of a connection 45 which is adjustably connected with the lever 21. The movement 44 is of the type commonly employed in clock mechanisms for sounding an alarm at a given time. The trip mechanism is such as to give warning in advance of the release of the barrier 25 because the latter must be operated when the exact number of packages or articles have been shipped or placed on board the carrier. The signal gives warning before the predetermined number has been loaded, thereby saving time and labor which heretofore have been wasted by loading trucks in excess of the number required to complete the number of packages, or articles to be shipped.

It is proposed to announce the passage of each loaded truck over the machine so that the person in charge may be advised of the registering of each article, or package, loaded. This is effected by means of a suitable signal which is actuated at each operation of the registering mechanism. In the simplest form the signal consists of a gong bell and a hammer. The gong bell may be the part 43 and the hammer coöperating therewith is indicated at 46, the same being connected with the lever 9 by means of a rod or like part 47. When the lever 9 is moved to actuate the registering mechanism the hammer 46 is likewise moved and strikes the bell 43, thereby indicating that the loaded truck has passed over the machine in a manner to operate the registering mechanism.

For convenience of disengaging the pawl 19 from the units wheel of the registering mechanism 14 a lever 46 is provided. One arm of such lever is connected to the pawl 19 and the other arm projects beyond the casing so as to be conveniently grasped when it is required to move the pawl 19 so that the registering mechanism may be properly set.

Having thus described the invention, what is claimed as new is:—

1. A registering machine including a platform having a plurality of depressible sections, a registering mechanism, a swingingly mounted lever for operating such mechanism operatively connected to one of the depressible sections to actuate the mechanism when such section is depressed, means normally locking said lever against movement and operatively connected to one of the depressible members to be swung out of locking position, and means automatically operable to hold the locking means out of operative position and releasable upon movement of the lever to actuate the registering mechanism.

2. A registering machine including a platform having a plurality of depressible sections, a registering mechanism, a swingingly mounted lever for operating said mechanism operatively connected to one of the depressible sections to actuate the mechanism when such section is depressed, means normally locking said lever against movement and operatively connected to one of the depressible members to be swung out of locking position, and means automatically operable to hold the locking means out of operative position and releasable upon movement of the lever to actuate the registering mechanism, said means also being releasable by depression of the depressible members.

3. A registering machine including a platform having raised depressible portions capable of being successively depressed by the passage of a truck in either direction, a registering mechanism, means including a lever for actuating the registering mechanism upon movement of the lever in one direction, means adapted in active position to hold the lever against movement in such direction, means adapted in active position to hold the lever holding means in inactive position, means operable by movement of the lever to swing the last mentioned means to inactive position, operative connection between one of the depressible members and the lever, operative connection between another of the depressible members and the lever holding means, and operative connection between the locking means for the lever holding means and another of the depressible members.

4. A registering machine including a registering mechanism, means including a depressible platform section for actuating the registering mechanism, automatic means for locking the actuating mechanism against operation, and a depressible member for releasing the actuating means disposed upon one side of the first depressible member.

5. A registering machine including a registering mechanism, an operating member therefor, a spring held lock for preventing improper movement of the operating member, a spring held detent for engaging the lock to hold it when thrown clear of the operating member, means adapted to be actuated by the operating member for moving the detent out of engagement with the lock to admit of the lock returning into the path of the operating member to prevent improper actuation thereof, a platform having a plurality of depressible sections successively engageable by a truck passing thereover, operative connection between one of the sections and the detent, operative connection between another of the sections and the lock, and operative connection between another of the sections and the operating member.

6. A registering machine including a registering mechanism, means coacting with the registering mechanism to cause a step by step actuation thereof by successive passages of trucks in a predetermined direction, and a barrier releasable by the registering mechanism when a predetermined number of trucks have passed for preventing passage of further trucks.

7. A passage registering machine including a registering mechanism, means engageable in passage for operating such mechanism, an automatic lock for the operating means, a detent for holding the lock in inoperative position, and independent means successively engageable in passage for releasing the detent and lock.

8. A registering machine including a registering mechanism, means for operating such mechanism, an automatic lock for the operating means, a detent for holding the lock in inoperative position, and independent means successively engageable for releasing the lock and detent, such means being so arranged that after being successively engaged they will by reverse engagement be returned to original position.

9. A registering machine including a registering mechanism, means including a depressible platform section for actuating the registering mechanism, automatic means for locking the actuating mechanism against operation, and means including a further depressible platform section for releasing the actuating mechanism.

In testimony whereof I affix my signature.

LINWOOD M. WHITEHEAD. [L. S.]

Copies of this patent may be obtained for five cents each, by addressing the "Commissioner of Patents, Washington, D. C."